(12) United States Patent
Nishi et al.

(10) Patent No.: US 9,767,335 B2
(45) Date of Patent: Sep. 19, 2017

(54) IMAGE PROCESSING METHOD FOR OPTICAL INFORMATION READER AND OPTICAL INFORMATION READER

(71) Applicant: OPTOELECTRONICS CO., LTD., Warabi-shi, Saitama (JP)

(72) Inventors: Kazuki Nishi, Choufu (JP); Takashi Ushiki, Warabi (JP)

(73) Assignee: OPTOELECTRONICS CO., LTD., Warabi-shi (JP)

( * ) Notice: Subject to any disclaimer, the term of this patent is extended or adjusted under 35 U.S.C. 154(b) by 0 days.

(21) Appl. No.: 15/160,199

(22) Filed: May 20, 2016

(65) Prior Publication Data

US 2016/0267308 A1 Sep. 15, 2016

Related U.S. Application Data

(63) Continuation-in-part of application No. PCT/JP2014/080635, filed on Nov. 19, 2014.

(30) Foreign Application Priority Data

Nov. 21, 2013 (JP) ................. 2013-241002

(51) Int. Cl.
*G06K 7/14* (2006.01)
*G06K 7/10* (2006.01)

(52) U.S. Cl.
CPC .......... *G06K 7/10831* (2013.01); *G06K 7/14* (2013.01); *G06K 7/1439* (2013.01); *G06K 7/146* (2013.01)

(58) Field of Classification Search
CPC .......... G06K 19/06037; G06K 7/1456; G06K 7/1413; G06K 7/1417; G06K 7/1491;

(Continued)

(56) References Cited

U.S. PATENT DOCUMENTS

| 5,444,231 A | 8/1995 | Shellhammer et al. |
| 2005/0279834 A1 | 12/2005 | Kitazumi |

(Continued)

FOREIGN PATENT DOCUMENTS

| EP | 0 449 634 A2 | 10/1991 |
| JP | 4-225486 A | 8/1992 |

(Continued)

OTHER PUBLICATIONS

Written Opinion dated Feb. 10, 2015, issued in counterpart International Application No. PCT/JP2014/080635, with English translation (11 pages).

(Continued)

*Primary Examiner* — Claude J Brown
(74) *Attorney, Agent, or Firm* — Westerman, Hattori, Daniels & Adrian, LLP

(57) ABSTRACT

For reading optical information arranged on a target object by analyzing an image of the target object captured through an imaging device, a plurality of blocks are disposed in an area of the image in which the optical information is arranged such that the plurality of blocks cover a whole range in the arrangement direction of the optical information, each of the blocks being in a parallelogram shape in which facing two sides are in parallel with a pixel arrangement direction of the image and the other two sides are vertical to the arrangement direction of the optical information, a first arrangement data indicating arrangement of the optical information in the block is generated for each of the blocks based on the image data of the block, and a second arrangement data indicating arrangement of the whole optical information is generated by combining the generated respective first arrangement data.

7 Claims, 12 Drawing Sheets

(58) Field of Classification Search
CPC ............... G06K 7/1439; G06K 9/3275; G06K 7/10831; G06K 7/14; G06K 7/146
USPC .................................................. 235/462.24
See application file for complete search history.

(56) References Cited

U.S. PATENT DOCUMENTS

| | | | | |
|---|---|---|---|---|
| 2009/0001165 A1* | 1/2009 | Zhang | ................ | G06K 7/1093 235/462.11 |
| 2011/0036909 A1* | 2/2011 | Berkun | ................ | G06K 7/14 235/462.1 |
| 2011/0290877 A1* | 12/2011 | Sun | ................ | G06K 7/14 235/436 |
| 2011/0290882 A1* | 12/2011 | Gu | ................ | G06K 7/1456 235/462.11 |
| 2013/0161398 A1* | 6/2013 | Silver | ................ | G06K 7/1413 235/462.25 |
| 2013/0177245 A1* | 7/2013 | Iwabuchi | ................ | G06K 7/1413 382/181 |
| 2014/0231523 A1* | 8/2014 | Polianko | ................ | G06K 7/1417 235/462.09 |

FOREIGN PATENT DOCUMENTS

| | | |
|---|---|---|
| JP | 7-105304 A | 4/1995 |
| JP | 2006-4353 A | 1/2006 |
| JP | 2011-186777 A | 9/2011 |

OTHER PUBLICATIONS

Bailey, "Super-resolution of bar codes", Journal of Electronic Imaging, Jan. 2001, vol. 10(1), pp. 213-220.

International Search Report dated Feb. 10, 2015, issued in counterpart International Application No. PCT/JP2014/080635 (1 page).

* cited by examiner

{Fig. 1}
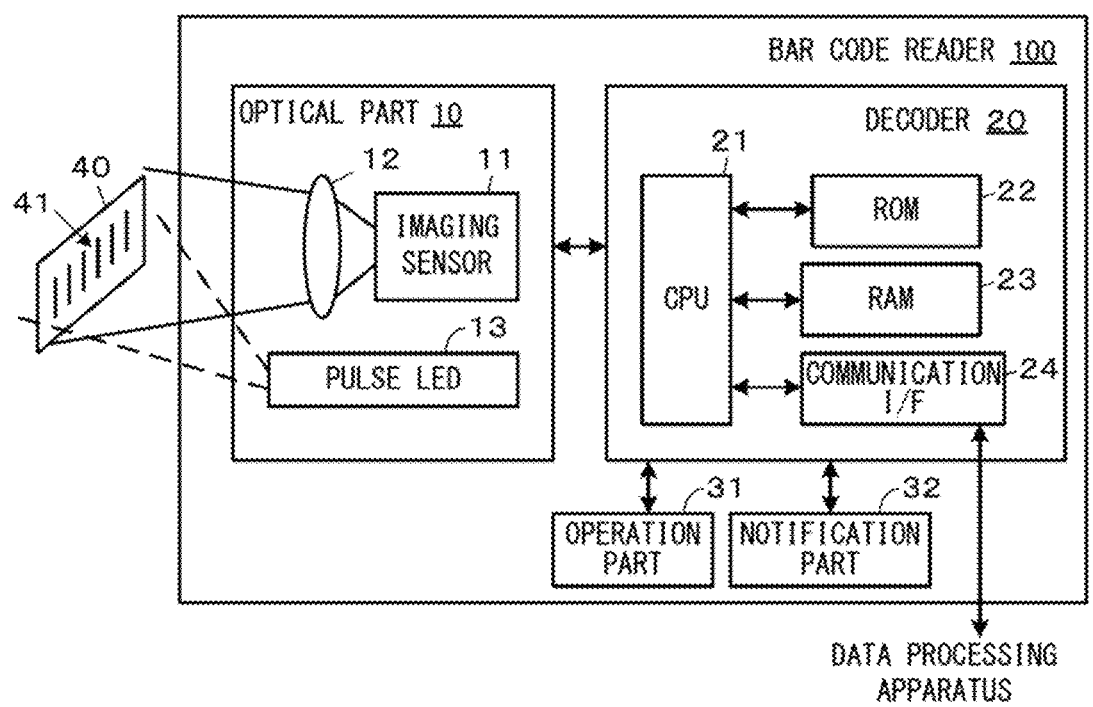

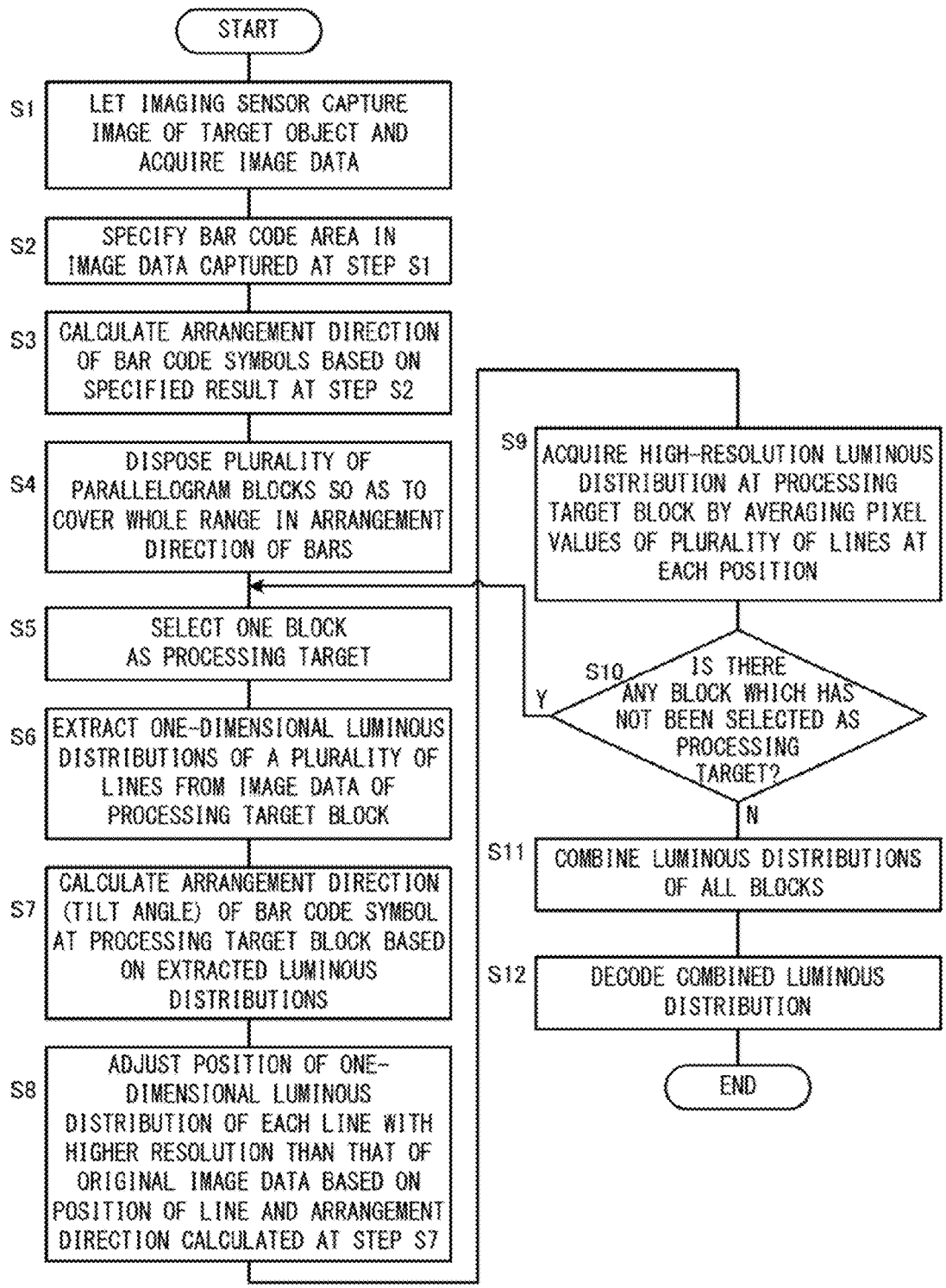
{Fig. 2}

{Fig. 3}
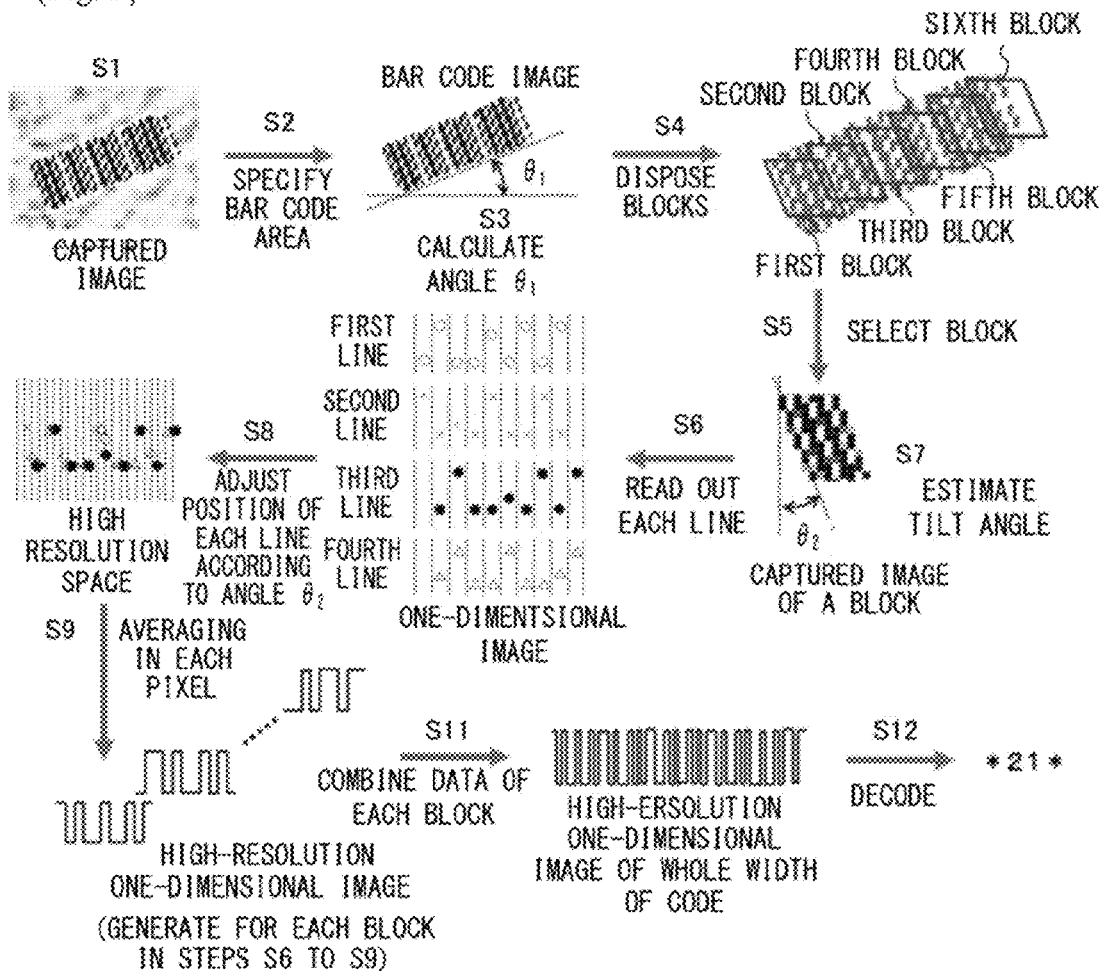
{Fig. 4}
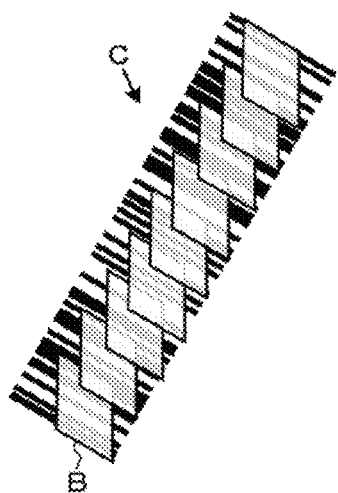

{Fig. 5}
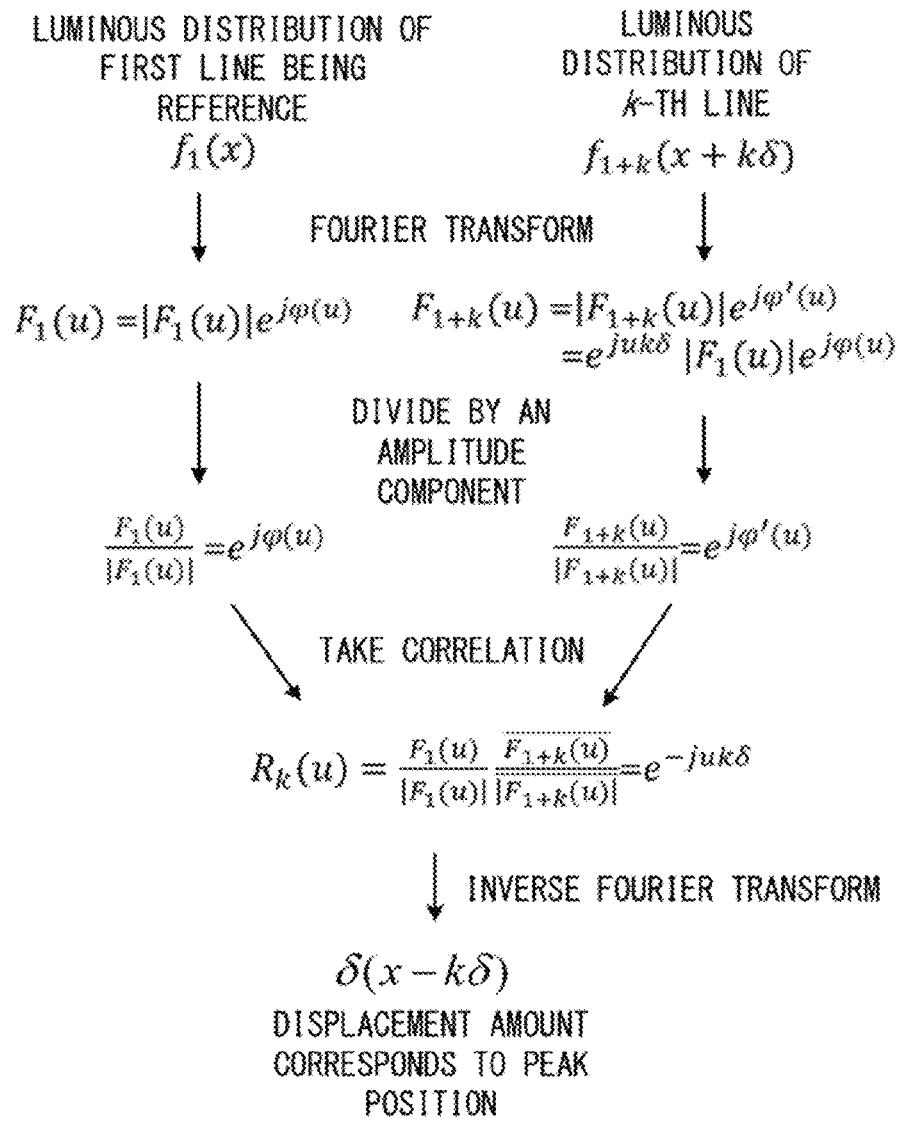
{Fig. 6}
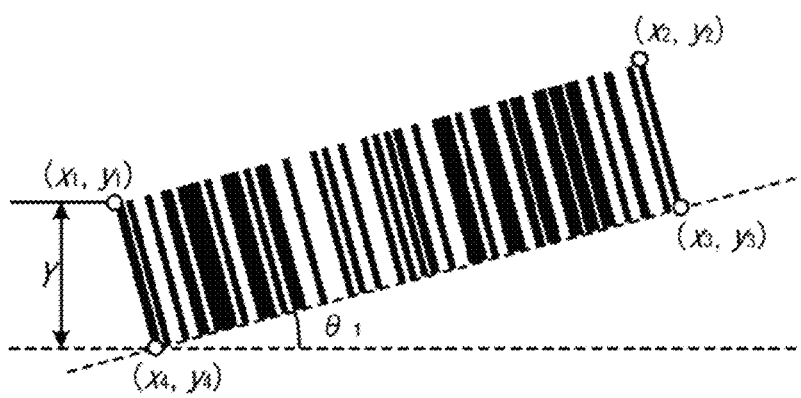

{Fig. 7}
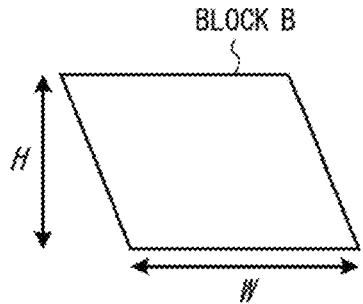
{Fig. 8}
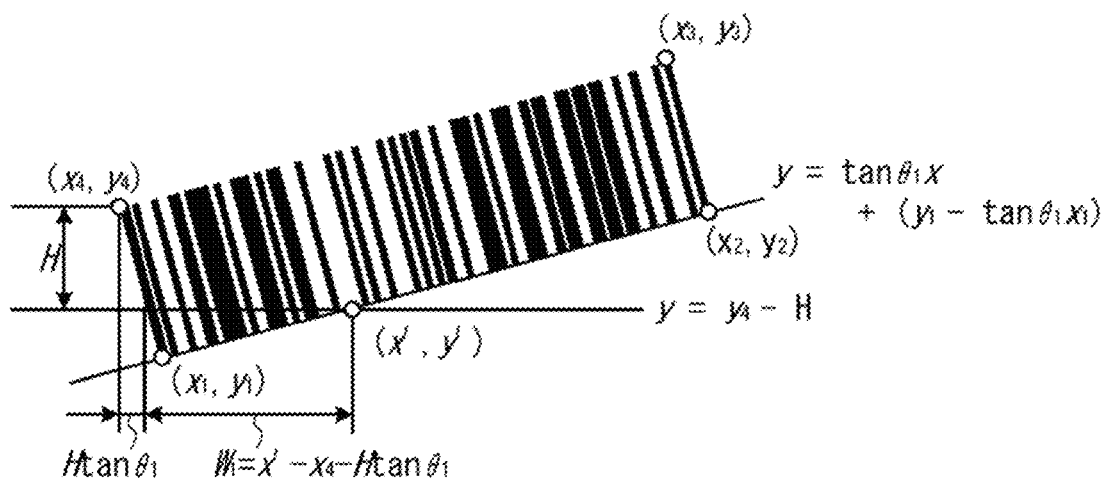
{Fig. 9}
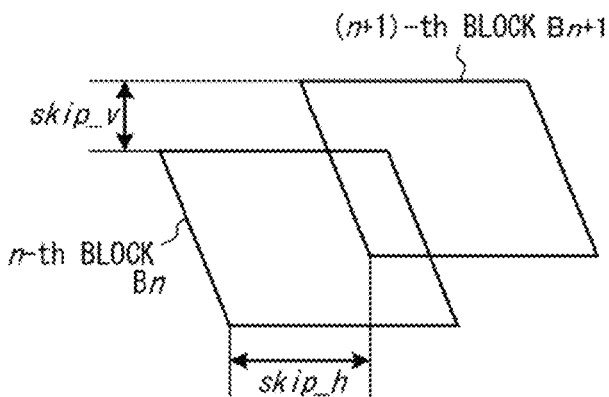

{Fig.10}
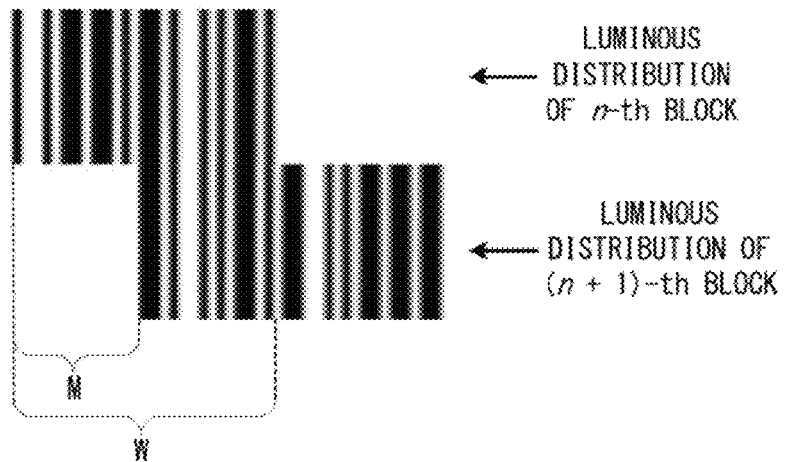
{Fig.11}
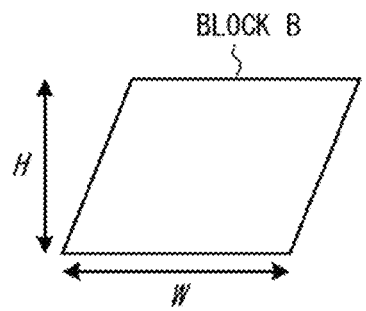
{Fig. 12}
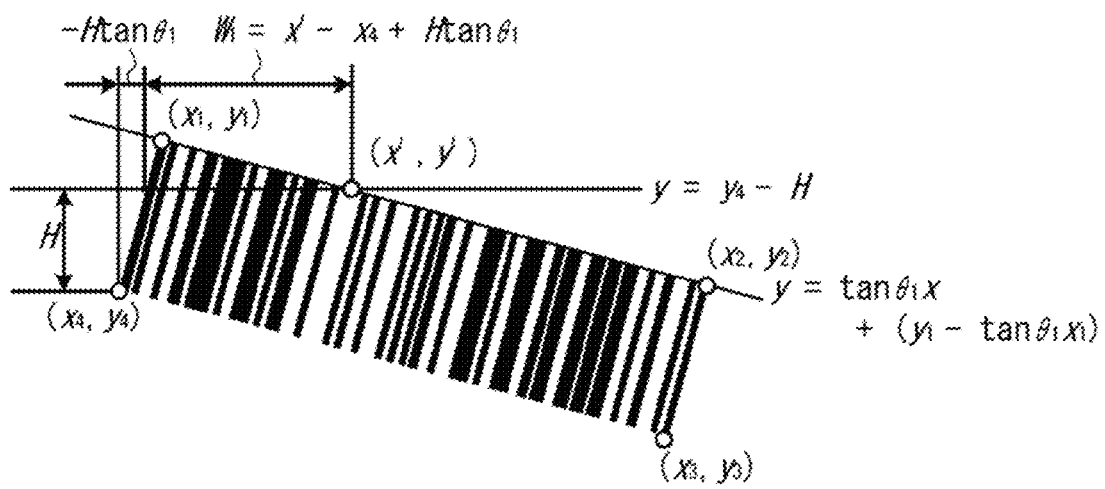

{Fig. 13A}
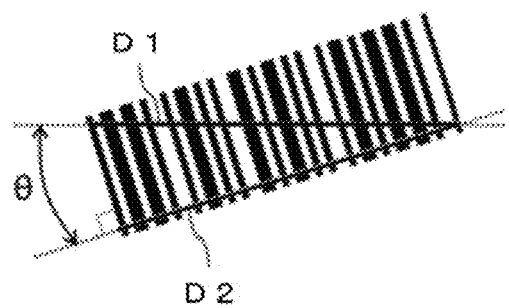
{Fig. 13B}
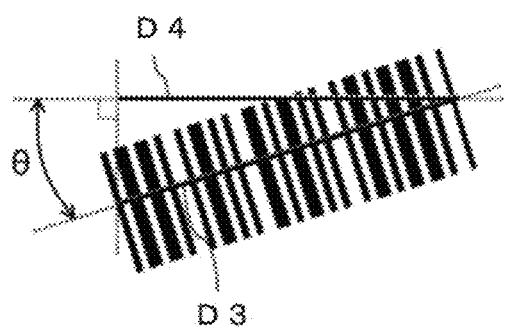

{Fig.14}

RESULTS OF READING USING FIRST COMPARATIVE EXAMPLE $\theta_1$ (deg)

| | | | | | |
|---|---|---|---|---|---|
| −90 | × | × | × | × | × |
| −85 | × | × | × | × | × |
| −80 | × | × | × | × | × |
| −75 | × | × | × | × | × |
| −70 | × | × | × | × | × |
| −65 | × | × | × | × | × |
| −60 | × | × | × | × | × |
| −55 | × | × | × | × | × |
| −50 | × | × | × | × | × |
| −45 | × | × | × | × | × |
| −40 | × | × | × | × | × |
| −35 | × | × | × | × | × |
| −30 | × | × | × | × | × |
| −25 | × | × | × | × | × |
| −20 | × | × | × | × | × |
| −15 | × | × | × | × | × |
| −10 | × | × | × | × | × |
| −5 | × | × | × | × | × |
| 0 | × | × | × | × | × |
| 5 | × | × | × | × | × |
| 10 | × | × | × | × | × |
| 15 | × | × | × | × | × |
| 20 | × | × | × | × | × |
| 25 | × | × | × | × | × |
| 30 | × | × | × | × | × |
| 35 | × | × | × | × | × |
| 40 | × | × | × | × | × |
| 45 | × | × | × | × | × |
| 50 | × | × | × | × | × |
| 55 | × | × | × | × | × |
| 60 | × | × | × | × | × |
| 65 | × | × | × | × | × |
| 70 | × | × | × | × | × |
| 75 | × | × | × | × | × |
| 80 | × | × | × | × | × |
| 85 | × | × | × | × | × |
| 90 | × | × | × | × | × |

{Fig. 15}

RESULTS OF READING USING SECOND COMPARATIVE EXAMPLE $\theta_1$ (deg)

| | | | | | |
|---|---|---|---|---|---|
| -90 | N/A | N/A | N/A | N/A | N/A |
| -85 | N/A | N/A | N/A | N/A | N/A |
| -80 | N/A | N/A | N/A | N/A | N/A |
| -75 | N/A | N/A | N/A | N/A | N/A |
| -70 | N/A | N/A | N/A | N/A | N/A |
| -65 | N/A | N/A | N/A | N/A | N/A |
| -60 | N/A | N/A | N/A | N/A | N/A |
| -55 | N/A | N/A | N/A | N/A | N/A |
| -50 | N/A | N/A | N/A | N/A | N/A |
| -45 | N/A | N/A | N/A | N/A | N/A |
| -40 | N/A | N/A | N/A | N/A | N/A |
| -35 | N/A | N/A | N/A | N/A | N/A |
| -30 | N/A | N/A | N/A | N/A | N/A |
| -25 | N/A | N/A | N/A | N/A | N/A |
| -20 | ○ | × | × | × | × |
| -15 | ○ | × | ○ | ○ | ○ |
| -10 | △ | ○ | △ | ○ | △ |
| -5 | ○ | ○ | ○ | ○ | × |
| 0 | N/A | N/A | N/A | N/A | N/A |
| 5 | ○ | ○ | ○ | ○ | ○ |
| 10 | ○ | ○ | × | ○ | ○ |
| 15 | ○ | × | ○ | ○ | × |
| 20 | × | × | × | × | × |
| 25 | N/A | N/A | N/A | N/A | N/A |
| 30 | N/A | N/A | N/A | N/A | N/A |
| 35 | N/A | N/A | N/A | N/A | N/A |
| 40 | N/A | N/A | N/A | N/A | N/A |
| 45 | N/A | N/A | N/A | N/A | N/A |
| 50 | N/A | N/A | N/A | N/A | N/A |
| 55 | N/A | N/A | N/A | N/A | N/A |
| 60 | N/A | N/A | N/A | N/A | N/A |
| 65 | N/A | N/A | N/A | N/A | N/A |
| 70 | N/A | N/A | N/A | N/A | N/A |
| 75 | N/A | N/A | N/A | N/A | N/A |
| 80 | N/A | N/A | N/A | N/A | N/A |
| 85 | N/A | N/A | N/A | N/A | N/A |
| 90 | N/A | N/A | N/A | N/A | N/A |

{Fig. 16}

RESULTS OF READING USING EMBODIMENT

| $\theta_i$ (deg) | | | | | |
|---|---|---|---|---|---|
| -90 | N/A | N/A | N/A | N/A | N/A |
| -85 | ○ | ○ | ○ | ○ | ○ |
| -80 | ○ | ○ | ○ | ○ | ○ |
| -75 | ○ | ○ | ○ | ○ | ○ |
| -70 | ○ | ○ | ○ | ○ | ○ |
| -65 | ○ | ○ | ○ | ○ | ○ |
| -60 | ○ | ○ | ○ | ○ | ○ |
| -55 | ○ | ○ | ○ | ○ | ○ |
| -50 | ○ | ○ | ○ | ○ | ○ |
| -45 | N/A | N/A | N/A | N/A | N/A |
| -40 | ○ | ○ | ○ | ○ | ○ |
| -35 | ○ | ○ | ○ | ○ | ○ |
| -30 | ○ | ○ | ○ | ○ | ○ |
| -25 | ○ | ○ | ○ | ○ | ○ |
| -20 | ○ | ○ | ○ | ○ | ○ |
| -15 | ○ | ○ | ○ | ○ | ○ |
| -10 | ○ | ○ | ○ | ○ | ○ |
| -5 | ○ | ○ | ○ | ○ | ○ |
| 0 | N/A | N/A | N/A | N/A | N/A |
| 5 | ○ | ○ | ○ | ○ | ○ |
| 10 | ○ | ○ | ○ | ○ | ○ |
| 15 | ○ | ○ | ○ | ○ | ○ |
| 20 | ○ | ○ | ○ | ○ | ○ |
| 25 | ○ | ○ | ○ | ○ | ○ |
| 30 | ○ | ○ | ○ | ○ | ○ |
| 35 | ○ | ○ | ○ | ○ | ○ |
| 40 | ○ | ○ | ○ | ○ | ○ |
| 45 | N/A | N/A | N/A | N/A | N/A |
| 50 | ○ | ○ | ○ | ○ | ○ |
| 55 | ○ | ○ | ○ | ○ | ○ |
| 60 | ○ | ○ | ○ | ○ | ○ |
| 65 | ○ | ○ | ○ | × | △ |
| 70 | ○ | ○ | ○ | ○ | ○ |
| 75 | ○ | ○ | ○ | ○ | ○ |
| 80 | ○ | ○ | ○ | ○ | ○ |
| 85 | ○ | × | ○ | × | ○ |
| 90 | N/A | N/A | N/A | N/A | N/A |

{Fig. 17}

RESULTS OF READING USING EMBODIMENT

SIZE OF BAR CODE SYMBOL

| DISTANCE | 8.0mil | 7.0mil | 6.0mil | 5.0mil | 4.0mil | 3.5mil | 3.0mil | 2.5mil | 2.0mil |
|---|---|---|---|---|---|---|---|---|---|
| 170mm | 5 | 5 | 3 | 5 | 5 | 4(1) | 1 | 0 | 0 |
| 160mm | 5 | 5 | 5 | 5 | 5 | 5 | 3 | 0 | 0 |
| 150mm | 5 | 5 | 5 | 5 | 5 | 5 | 5 | 1(1) | 0 |
| 140mm | 5 | 5 | 5 | 5 | 5 | 5 | 5 | 5 | 0 |
| 130mm | 5 | 5 | 5 | 5 | 5 | 5 | 5 | 5 | 0(1) |
| 120mm | 5 | 5 | 5 | 5 | 5 | 5 | 5 | 5 | 0 |
| 110mm | 5 | 5 | 5 | 5 | 5 | 5 | 5 | 5 | 5 |
| 100mm | 5 | 5 | 5 | 5 | 5 | 5 | 5 | 5 | 4 |
| 90mm | 5 | 5 | 5 | 5 | 5 | 0 | 0 | 0 | 0 |
| 80mm | 5 | 5 | 0 | 0 | 0 | 0 | 0 | 0 | 0 |
| 70mm | 5 | 0 | 0 | 0 | 0 | 0 | 0 | 0 | 0 |

{Fig. 18}

RESULTS OF READING USING FIRST COMPARATIVE EXAMPLE

SIZE OF BAR CODE SYMBOLE

| DISTANCE | 8.0mil | 7.0mil | 6.0mil | 5.0mil | 4.0mil | 3.5mil | 3.0mil | 2.5mil | 2.0mil |
|---|---|---|---|---|---|---|---|---|---|
| 170mm | 5 | 0 | 0 | 0 | 0 | 0 | 0 | 0 | 0 |
| 160mm | 5 | 5 | 0 | 0 | 0 | 0 | 0 | 0 | 0 |
| 150mm | 5 | 5 | 1 | 0 | 0 | 0 | 0 | 0 | 0 |
| 140mm | 5 | 5 | 5 | 0 | 0 | 0 | 0 | 0 | 0 |
| 130mm | 5 | 5 | 5 | 0 | 0 | 0 | 0 | 0 | 0 |
| 120mm | 5 | 5 | 5 | 5 | 0 | 0 | 0 | 0 | 0 |
| 110mm | 5 | 5 | 5 | 5 | 0 | 0 | 0 | 0 | 0 |
| 100mm | 5 | 5 | 5 | 4 | 1 | 0 | 0 | 0 | 0 |
| 90mm | 5 | 5 | 5 | 5 | 0 | 0 | 0 | 0 | 0 |
| 80mm | 5 | 5 | 0 | 0 | 0 | 0 | 0 | 0 | 0 |
| 70mm | 2 | 0 | 0 | 0 | 0 | 0 | 0 | 0 | 0 |

{Fig. 19}
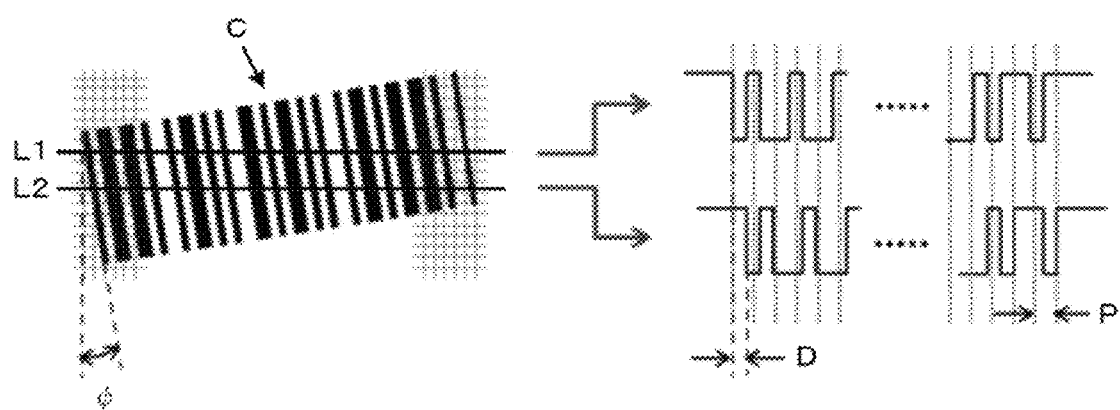
{Fig. 20}
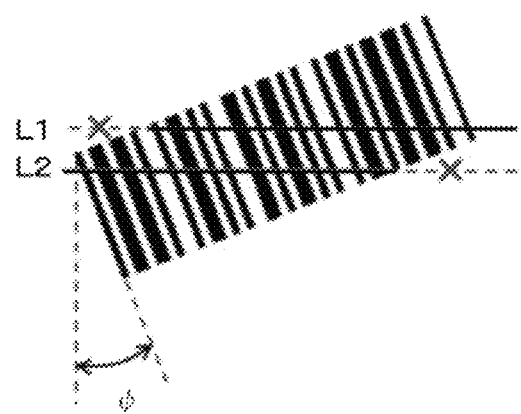

IMAGE PROCESSING METHOD FOR OPTICAL INFORMATION READER AND OPTICAL INFORMATION READER

TECHNICAL FIELD

The invention relates to an image processing method for an optical information reader which reads optical information on a target object by analyzing an image of the target object captured through an imaging device, and to the optical information reader. In particular, the invention relates to an image processing method and an optical information reader suitable for reading optical information in which information is arranged only in one direction.

BACKGROUND ART

It has been conventionally known a reader which reads code symbols such as barcodes as an optical information reader which reads optical information on a reading target object by capturing an image of the reading target object through an imaging device and analyzing the image.

In the optical information reader as stated above, technologies described in NPL1 and PTL1 have been known as conventional technologies enabling reading of a barcode image which is difficult to read because of insufficient resolution by enhancing the resolution.

The technologies described in these documents are ones to obtain a high resolution image by using one-dimensional images of a plurality of lines each crossing a barcode area in a horizontal direction for a tilted barcode image and combining the images.

As illustrated in FIG. 19, gradations of a code symbol shown in one-dimensional images along two lines L1, L2 which cross a barcode area C have a lateral displacement D with a width of a non-integral multiple of a pixel pitch P depending on the tilt of the image, and the images may have information of resolution in the pixel pitch P or less. Accordingly, it is possible to enhance the resolution of the image by combining the images along the lines L1, L2.

Besides, in PTL2, it is described a technology in which a barcode is captured by an image sensor disposed under a state tilted for 45 degrees relative to a rectangular reading port, then two adjacent lines crossing the barcode which are in parallel with a diagonal line of the image are displaced for a half pitch from one another, so this displacement is utilized to obtain approximately double resolution by combining the lines relative to a case when one line is used.

CITATION LIST

Patent Literature

{PTL1} JP 2011-186777 A
{PTL2} JP 2006-4353 A

Non Patent Literature

{NPL1} Donald G Bailey, "Super-resolution of barcodes", Journal of Electronic Imaging, January 2001, vol. 10(1), p. 213-220

SUMMARY OF INVENTION

Technical Problem

However, as for the technologies described in NPL1 and PTL1, when a tilt $\psi$ of the barcode in the captured image is large, it is impossible to draw the lines L1, L2 in the horizontal direction which pass through a whole width of the barcode area C, as illustrated in FIG. 20. In this case, the one-dimensional image along each line is missed in a middle of the code symbol, and therefore, there has been a problem that it is difficult to enhance the resolution for the whole width of the barcode.

Besides, as for the technology described in PTL2, a pitch becomes $\sqrt{2}$ times relative to a pixel on the diagonal line of the image, and therefore, there has been problems in which the resolution improves only for $\sqrt{2}$ times at most even if the two adjacent lines are combined, in addition, a maximum performance is exhibited only when the barcode is correlatively tilted for 45 degrees relative to the image sensor.

The invention is made in consideration of the background as stated above, and an object thereof is to enable to read fine information with high accuracy regardless of an arrangement direction of optical information in an image when the optical information on a target object is read by capturing the image of the target object by an imaging device and analyzing it.

Solution to Problem

To attain the above object, an image processing method of the invention is an image processing method for an optical information reader which reads optical information arranged on a target object by analyzing an image of the target object captured through an imaging device, including: calculating an arrangement direction of the optical information in the image captured by the imaging device; disposing, in an area of the image in which the optical information is arranged, a plurality of blocks such that the plurality of blocks cover a whole range in the arrangement direction of the optical information, each of the blocks being in a parallelogram shape in which facing two sides are in parallel with a pixel arrangement direction of the image and the other two sides are vertical to the arrangement direction of the optical information; generating, for each of the blocks, a first arrangement data indicating arrangement of the optical information in the block based on the image data of the block; and generating a second arrangement data indicating arrangement of the whole optical information by combining the respective first arrangement data for the plurality of the blocks.

In such an image processing method, it is conceivable that the generating of the first arrangement data includes for each of the blocks: calculating a second arrangement direction of the optical information in the block; and generating the first arrangement data based on the second arrangement direction.

Further, it is also conceivable that the generating of the first arrangement data includes for each of the blocks: aligning positions of plural lines of the image data in the block with higher resolution than that of the image data based on the positions of the lines and the arrangement direction of the optical information in the block, the lines being in parallel with the facing two sides of the block; and generating the first arrangement data with the higher resolution based on the plural lines of the image data after the aligning.

Further, it is also conceivable that the disposing is disposing the plurality of blocks such that adjacent blocks partially overlap with each other, and, in the generating of the second arrangement data, the first arrangement data of the adjacent blocks are combined such that the first arraignment data of the adjacent blocks match with each other in an overlapping portion of the adjacent blocks.

Further, it is also conceivable that a size of the block is determined based on coordinates of four corners of the area in which the optical information is arranged in the image of the target object and the calculated arrangement direction of the optical information.

Further, it is also conceivable that the above image processing method further includes decoding the generated second arrangement data.

The invention can be embodied as an arbitrary style such as a device, a system, a computer program, and a storage medium storing a computer program, other than the above method.

Advantageous Effects of Invention

According to an image processing method of an optical information reader and an optical information reader of the invention, it is possible to read fine information with high accuracy regardless of an arrangement direction of optical information in an image when the optical information on a target object is read by capturing the image of the target object by an imaging device and analyzing it.

BRIEF DESCRIPTION OF DRAWINGS

FIG. 1 is a block diagram illustrating a hardware configuration of a barcode reader being an embodiment of an optical information reader of the invention.

FIG. 2 is a flowchart of a process executed by a CPU when the barcode reader illustrated in FIG. 1 performs reading of a barcode symbol.

FIG. 3 schematically illustrates the processes performed at each step in FIG. 2.

FIG. 4 illustrates a disposition example of blocks when $45° \le |\theta_1| < 90°$.

FIG. 5 is a view to explain an outline of a phase only correlation method.

FIG. 6 is illustrates a definition of coordinates of four corners of a barcode area.

FIG. 7 illustrates an example of a shape of a block.

FIG. 8 illustrates a size (H and W) of a block found from the coordinates illustrated in FIG. 6.

FIG. 9 illustrates a positional relationship between a certain block and an adjacent block.

FIG. 10 is illustrates a relationship between a luminance distribution obtained from an image data of an n-th block and a luminance distribution obtained from an image data of an (n+1)-th block.

FIG. 11 illustrates a shape example of a block when $-45° \le \theta_1 < 0°$, corresponding to FIG. 7.

FIG. 12 illustrates a size (H and W) of the block when $-45° \le \theta_1 < 0°$, corresponding to FIG. 8.

FIG. 13A is a view to explain a mechanism which enables high resolution through the processes in FIG. 2.

FIG. 13B is another view to explain the same.

FIG. 14 illustrates an example of results of reading of a barcode symbol according to a configuration of a first comparative example.

FIG. 15 illustrates an example of results of reading of a barcode symbol according to a configuration of a second comparative example.

FIG. 16 illustrates an example of results of reading of a barcode symbol according to a configuration of the embodiment of the invention.

FIG. 17 illustrates another example of results of reading of a barcode symbol according to a configuration of the embodiment of the invention.

FIG. 18 illustrates another example of results of reading of a barcode symbol according to a configuration of the first comparative example.

FIG. 19 is a view to explain a conventional way of enhancing the resolution.

FIG. 20 is a view to explain problems in the conventional way of enhancing the resolution.

DESCRIPTION OF EMBODIMENTS

Hereinafter, an embodiment for carrying out the invention will be concretely described based on the drawings.

At first, a barcode reader being an embodiment of an optical information reader of the invention is described.

FIG. 1 is a block diagram illustrating a hardware configuration of the barcode reader.

As illustrated in FIG. 1, a barcode reader 100 is an apparatus for reading a barcode symbol 41 being information illustrated by a symbol whose light reflectance is different from those of surroundings on a reading target object 40. A user operates the barcode reader 100 while holding it (or at least an optical part 10) in a hand The barcode reader 100 includes the optical part 10, a decoder 20, an operation part 31, and a notification part 32.

Among them, the optical part 10 includes an imaging sensor 11, a lens 12, and a pulse LED (light-emitting diode) 13.

The imaging sensor 11 is an imaging device to capture an image of the reading target object 40, and for example, it can be made up of a CMOS (complementary metal oxide semiconductor) image sensor. Besides, the imaging sensor 11 is capable of generating an image data indicating a gradation value of each pixel based on an electric charge accumulated on each pixel of the image sensor by capturing the image, and outputting the image data to the decoder 20. In this imaging sensor 11, the pixels are two-dimensionally disposed.

The lens 12 is an optical system to form an image of reflected light from the reading target object 40 which includes the barcode symbol 41 on the imaging sensor 11. The lens 12 may be made up of one piece of lens, or a plurality of lenses. Besides, a lens whose focal length is adjustable may be used.

The pulse LED 13 is an illuminating device to irradiate illumination light to the reading target object 40 being an image-capturing object.

Next, the decoder 20 includes a CPU 21, a ROM 22 which stores programs executed by the CPU 21 and data such as various tables, a RAM 23 which is used as a work area when the CPU 21 performs various processes, and a communication I/F 24 to communicate with external equipments.

As the CPU 21, the ROM 22, and the RAM 23, for example, it is possible to use an ASIC (application specific integrated circuit), a flash ROM (FROM), an SDRAM (synchronous dynamic random access memory), and so on.

The CPU 21 controls operations of an overall barcode reader 100 including the optical part 10, the operation part 31, and the notification part 32 by executing programs stored in the ROM 22 using the RAM 23 as the work area. Besides, the CPU 21 also performs processes such as detection and decoding of the barcode symbol 41 included in the image data of the images captured by the imaging sensor 11, output to external or accumulation of the decoding results, adjustment of illumination light amount (or time) by the pulse LED 13, and so on.

The communication I/F 24 is an interface to communicate with data processing apparatuses such as a PC (personal computer) which processes the decoding results by the decoder 20, and an arbitrary protocol regardless of wired or wireless is applicable. Besides, the barcode reader 100 may be configured such that control parameters can be set to the decoder 20 based on data read from the communication I/F 24.

The operation part 31 is an operation device such as a button and a trigger to accept operations by the user. Here, a trigger to instruct starting of reading of the code symbol is included.

The notification part 32 is a notification device to perform various notifications to the user. As concrete notification methods, there are conceivable displaying of messages and data by a display, lighting or blinking of a lamp, output of sounds by a speaker, and so on, but it is not limited thereto. Here, a speaker and a lamp are included as the notification part 32.

In the barcode reader 100 as stated above, the image data obtained by the imaging sensor 11 by capturing the image of the barcode symbol 41 is analyzed by the decoder 20, an arrangement data indicating an arrangement of bars in the barcode symbol 41 is generated through the analysis, and the barcode reader 100 can read the barcode symbol 41 by decoding the arrangement data.

One of characteristic points in the barcode reader 100 is in a process for generating the arrangement data from the image data obtained by the image-capturing. This point is described below.

A flowchart of a process executed by the CPU 21 when the barcode reader 100 reads the barcode symbol is illustrated in FIG. 2. FIG. 3 is a view schematically illustrating the processes performed at each of the steps.

The CPU 21 starts the process illustrated in the flowchart in FIG. 2 by executing necessary programs stored in the ROM 22 when the CPU 21 judges that the reading of the barcode symbol is to be performed. An instruction to perform the reading by the user, detection of a timing to perform regular reading, and so on may be a trigger for the judgment.

At first, the CPU 21 transmits a predetermined command to the optical part 10 to let the imaging sensor 11 capture an image of the reading target object 40, and acquires the image data (S1). Next, the CPU 21 specifies an area of an image of the barcode symbol 41 in the image data acquired at step S1 as a barcode area (S2). It is performed by detecting a structure or the like where white and black bars are arranged at a predetermined interval in the captured image. Note that the barcode area may be cut out from the captured image to be used in subsequent processes.

Next, the CPU 21 calculates an arrangement direction of the bars in the barcode area as an arrangement direction of optical information of the reading target based on the specified result at step S2 (S3). This calculation may be a rough one, and an arbitrary method can be used. For example, a tilt of a long side of an approximately rectangle which forms the barcode area is found by using coordinates of four corners of the barcode area specified at step S2 in the image, and an arc tangent of the tilt is found as the arrangement direction.

This arrangement direction is represented by an angle $\theta_1$ while setting a horizontal direction of the image as a reference as illustrated by S3 in FIG. 3. Besides, a range thereof is $-90° < \theta_1 < 90°$.

Next, the CPU 21 disposes a plurality of parallelogram blocks so as to cover a whole range in the arrangement direction of the bars (S4) in the barcode area specified at step S2. Each block has a parallelogram shape in which facing two sides (here, up and down sides in the drawing) are in parallel with a pixel arrangement direction of the image, and the other two sides adjacent thereto (here, left and right sides in the drawing) are vertical to the arrangement direction of the bars (parallel to a longitudinal direction of the bars).

As illustrated by S4 in FIG. 3, it is preferable that adjacent blocks are disposed to partially overlap with each other. The overlapped area is provided to enable a safe connection between the blocks while excluding both end parts where errors become large in later-described one-dimensional images, and an overlapped width may be determined to a degree enabling the safe connection. Note that it is not essential to provide the overlapped area. Besides, both end blocks may protrude from the barcode area. In an example in FIG. 3, the first block is disposed at an end part of the barcode area as a reference, and therefore, only the sixth block protrudes from the barcode area.

Besides, in each block, a lateral width is selected to be long within a range in which expansion and contraction of the barcode in the block is regarded to be constant, and a height is selected to be large within a range in which each block (except the blocks at the end parts) is included in the barcode image. Methods to determine the size and the overlapped width are described later.

Besides, when $0° \leq |\theta_1| \leq 45°$, the block is one in which the up and down two sides are in parallel with the horizontal direction of the image as illustrated in FIG. 3, but when $45° \leq |\theta_1| < 90°$, the block is one in which the left and right two sides are in parallel with a vertical direction of the image as illustrated in FIG. 4. It is the same as the case when $0° \leq |\theta_1| \leq 45°$ that the other two sides adjacent thereto are vertical to the arrangement direction of the bars. When $45° \leq |\theta_1| < 90°$, the blocks are set to be as stated above because the blocks become too thin, and it would be an obstacle for a coupling process at step S11 if the blocks are disposed by the same way as the case of $0° \leq |\theta_1| \leq 45°$.

Here, it is described based on the case when $0° \leq |\theta_1| \leq 45°$ unless otherwise specified, but it is applicable for the other cases when $\theta_1$ is an angle within the other ranges if a little modification is added to the process described here.

Next, the CPU 21 performs a process of steps S6 to S9 while selecting one of the blocks disposed at step S4 as a processing target (S5).

Namely, at first, the CPU 21 extracts image data of a plurality of lines from the image data of the processing target block (S6). The extracted image data is a one-dimensional luminous distribution along a line. Besides, the lines extracted here are lines which are in parallel with the above-stated up and down two sides, namely, in parallel with the sides in a pixel arrangement direction of the image (here, the horizontal direction). An example in which the one-dimensional luminous distributions for four lines are extracted is illustrated in FIG. 3. A lateral direction represents an arrangement of pixels, and a longitudinal direction represents a luminous level at each pixel in the drawing.

Besides, at this time, it is preferable to enable to subsequently specify positional relationships among each line. This may be one directly specifying a position of each line such that, for example, to store a coordinate of a start position (a left end, or the like) of each line in the image. Besides, it is also conceivable to store for what number of pixels each line is kept off from the first line being a reference, to enable to calculate displacement of each line from the reference line as a number of pixels using the stared number and $\theta_1$.

Note that as for the luminous distribution at the end part of each line, it is desirable to cut off the end part when it is coupled to the data of an adjacent block as described later. In this case, the luminous distribution at the end part of the line is seldom reflected on a final decoding result, and therefore, there is no large problem if the start position or an end position of each line displaces a little from a position where the block is set as long as the positional relationship of the line can be specified.

Next, the CPU 21 calculates an arrangement direction (tilt angle) of the barcode symbol at the processing target block based on the extracted luminous distributions (S7). This calculation may be performed by using the phase only correlation method described in, for example, IEICE Fundamentals Review, Vol. 1, No. 1, pp. 30-40, July 2007.

The one-dimensional luminous distribution of each line acquired at step S6 must be basically the luminous distribution corresponding to the same bar of the barcode symbol as it can be seen from the disposition of the blocks illustrated in FIG. 3. However, the bar does not completely overlap with the pixel, and therefore, a positional displacement less than one pixel is contained in accordance with a position in the vertical direction in the drawing. Besides, when calculation accuracy of $\theta_1$ is insufficient, or when the arrangement direction of the bars is locally displaced at the position of the processing target block because the barcode symbol 41 is distorted, the positional displacement according thereto also occurs.

At step S7, at first, degree of displacement of the luminous distribution of each line in a line direction is calculated with accuracy of a pixel pitch or more while using one line (for example, the first line) as a reference. The phase only correlation method is used for the calculation.

An outline thereof is illustrated in FIG. 5.

Here, $f_1(x)$ is a luminous distribution of the first line being the reference, and $f_{1+k}(x+k\delta)$ is a luminous distribution of a k-th line whose displacement amount is to be found, where $k\delta$ is a positional displacement amount. A function $\delta(x-k\delta)$ is obtained by Fourier transforming each of these two luminous distributions, dividing the Fourier transformed functions by an amplitude component, taking the correlation of the results, and performing the inverse Fourier transformation of the function of the correlation. Position of a peak appears in $\delta(x-k\delta)$ corresponds to the displacement amount of the luminous distributions between the first line and the k-th line.

It is possible to find an arrangement direction $\theta_2$ (it is a value having the same meaning as $\theta_1$ though a description form is different from $\theta_1$, because a state in which the image is cut out into a block shape is illustrated in FIG. 3) of the bars at the processing target block from the displacement amount which is obtained by the above-stated calculation performed regarding each line. $\theta_1$ found at step S3 is a rough tilt angle of a whole of the barcode symbol 41, and $\theta_2$ is obtained as a high accurate tilt angle where $\theta_1$ is corrected by each block.

Note that as for the one-dimensional luminous distribution of each line acquired at step S6, a correction amount equivalent to "$\theta_2-\theta_1$" may be calculated while aligning left ends thereof by using $\theta_1$ as a reference as illustrated in "one-dimensional image" in FIG. 3, or $\theta_2$ may be directly calculated in consideration of displacement of the start position of the line. In any case, the phase only correlation method is applicable.

The description is returned to FIG. 2 and FIG. 3, then the CPU 21 adjusts a position of the one-dimensional luminous distribution of each line with higher resolution than that of the original image data based on the position of the line and the arrangement direction $\theta_2$ calculated at step S7 (S8). The one-dimensional luminous distribution whose resolution is higher than the one-dimensional luminous distribution of the original line is thereby obtained. This process corresponds to the "super-resolution method" or the "pixel shift method" described in NPL1.

More specifically, at first, a one-dimensional high pixel space where the number of pixels is increased to an integral multiple of the original one-dimensional luminous distribution is prepared. There is a limit in enhancing the resolution resulting from transfer characteristics of an optical system, and normally, it is enough if the number of pixels is made to be twice to four times of an original one. Here, it is described the case of twice as an example.

Next, each pixel value of the one-dimensional luminous distribution of each line obtained at step S6 is disposed on the high pixel space at every other pixel. At this time, a lateral displacement amount of each one-dimensional luminous distribution is calculated with accuracy finer than a pixel pitch (for example, an order of magnitude finer) from the arrangement direction $\theta_2$ calculated at step S7, and the lateral displacement is corrected by disposing the pixel value at a position shifted in an opposite direction for twice the number of pixels of the calculated lateral displace amount (rounding off to the decimal place).

For example, when the second line is kept off from the first line by 10 pixels, and $\theta_2=15°$, the luminous distribution of the second line is displaced by $10 \times \tan 15° \approx 2.68$ pixels from the luminous distribution of the first line.

Namely, it is considered that if the luminous distribution of the second line is shifted in a left direction in FIG. 3 by 2.68 pixels, it coincides with the luminous distribution of the first line. Accordingly, the luminous distribution of the second line is to be disposed on the high pixel space while being shifted to the left by five pixels (corresponding to 2.5 pixels at the image-capturing time) which is twice the shift and rounded off to the decimal place, to correspond to the higher resolution.

Note that the displacement amount given here is a value including the displacement amount of the start position of the line. Therefore, for example, when the start position of the second line is displaced by two pixels to the right in the line direction (here, the horizontal direction) relative to the start position of the first line, the data of the luminous distribution itself is to be disposed on the high pixel space while being shifted to the left by 2.5−2=0.5 pixels (this pixel number is counted as pixels at the image-capturing time).

The process as stated above is performed for all of the lines, and thereby, the luminous distributions whose peak positions corresponding to the respective bars are aligned are disposed on the high pixel space.

The CPU 21 can generate and acquire the high-resolution luminous distribution at the processing target block by averaging the pixel values of the respective lines disposed at the pixel as for each pixel on the high pixel space (S9). The acquired luminous distribution corresponds to the arrangement data indicating the arrangement of the bars in the barcode symbol 41.

The CPU 21 repeats the process by returning to step S5 when there is a block which has not been selected as the processing target yet (S10), and proceeds to step S11 after the luminous distributions in high resolution are generated as for all of the blocks at step S9.

Next, the CPU 21 acquires the one-dimensional luminous distribution in high resolution corresponding to a whole width of the barcode symbol 41 by combining the luminous distributions of all blocks (S11), acquires the data indicated by the barcode symbol 41 by decoding the acquired one-dimensional luminous distribution (S12), and ends the process. The decoding at step S12 may be appropriately performed by a publicly-known method while handling the data acquired at step S11 as the luminous distribution data for one line of the barcode symbol 41.

The data obtained by the decoding is outputted from the communication I/F 24 to a data processing apparatus or stored in the RAM 23 to be referred later. Besides, when the decoding cannot be performed normally, the CPU 21 notifies it to the user and repeat the process again from step S1 if necessary, though it is not illustrated.

Note that when the coupling is performed at step S11, the positional relationship between the blocks is already grasped at step S4, and therefore, it is possible to calculate by how many pixels the luminous distributions should be shifted when coupling the luminous distributions of the adjacent blocks so as to obtain the same positional relationship as that in the original captured image, based on the positional relationship between the blocks. Accordingly, the coupling may be performed while shifting one or both of the luminous distributions by the calculated number of pixels.

Otherwise, it is also conceivable that data of the luminous distributions of the adjacent blocks is compared regarding portions where the adjacent blocks overlaps with each other while changing the positional relation between the adjacent blocks, and a position where a difference between the luminous distributions of the adjacent blocks in the overlapping portion becomes the minimum is searched to couple the adjacent blocks at the position. Namely, the adjacent blocks may be coupled at a position where the luminous distributions of the adjacent blocks match with each other. It is thereby possible to perform a proper coupling so as to restore the arrangement of the original barcode symbol 41, even when displacement occurred during a process of creating the luminous distribution of each block due to the difference in the arrangement directions of the bars by each block, or the like.

Besides, in any case, adjustment is appropriately performed as for a portion where data of the adjacent blocks overlap with each other, such that the data of the both blocks are averaged, or either one of the data is employed. At this time, accuracy of the data at the end portion of each block may deteriorate due to excess or deficiency of data at the time of the positional adjustment of each line in the block. Therefore, the coupling process may be preferably performed after excluding a part (for example, 5% in the number of pixels) of the data at the end portion. Note that it is also possible to couple the data of each block without providing the overlapped portions between the blocks and without cutting off the data at the end portions if the accuracy is slightly sacrificed.

In the processes in FIG. 2, step S3 corresponds to a first step, step S4 corresponds to a second step, steps S6 to S9 corresponds to a third step, step S11 corresponds to a fourth step, and step S12 corresponds to a fifth step. Besides, the CPU 21 respectively functions as a first device to a fifth device in each of the first to fifth steps.

Next, examples of determination methods of a size and a position of the block disposed at step S4 in FIG. 2 are described using FIG. 6 to FIG. 12.

At first, as illustrated in FIG. 6, $(x_1, y_1)$ to $(x_4, y_4)$ are the coordinates of the four corners of the barcode area in the image specified at step S2. A first component represents a position in a horizontal axis direction, a second component represents a position in a vertical axis direction by the number of pixels respectively. Besides, as illustrated in FIG. 7, W is a length of a side which is in parallel with the pixel arrangement direction of the image among the parallelogram constituting the block, and H is a height when the side is a base.

Since the block is disposed to be fall within the barcode area, and therefore, it is necessary that the block height H satisfies H<Y, where $Y=y_4-y_1$. Besides, when H≈Y, a lateral width of the block is seldom secured, and therefore, for example, H may be determined by H=¾×Y. Note that a relationship between H and Y is not limited thereto, and it may be dynamically calculated in accordance with a direction and a shape of the barcode area as described later.

Here, when it is considered to secure the lateral width of the block as wide as possible, the first block is preferably disposed such that an upper left vertex in FIG. 7 positions at $(x_4, y_4)$. In this case, a left side of the first block comes to a position overlapped with a bar at a leftmost of the barcode symbol 41 in FIG. 8. Besides, a lower side of the first block positions on a line $y=y_4-H$ illustrated in FIG. 8.

Accordingly, a right end of the first block can be extended to an intersection point between a line connecting $(x_1, y_1)$ and $(x_2, y_2)$, and the line $y=y_4-H$ at the maximum. An expression of the former line can be represented by using $\theta_1$ as follows.

$$y=\tan\theta_1 x+(y_1-\tan\theta_1 x_1)$$

When a coordinate of the intersection point is assumed be (x', y'), a maximum value $W_{max}$ of the base length W of the block is as follows.

$$W_{max}=x'-x_4-H\tan\theta_1$$

However, here, the base length W is set as follows with some margin.

$$W=¾\times W_{max}=¾\times(x'-x_4-H\tan\theta_1)$$

Note that it is desirable that W is at least 25 pixels or more to properly perform the process at steps S6 to S9 in FIG. 2 and the coupling subsequent thereto. Accordingly, when W calculated according to the above is less than 25 pixels, it is desirable to perform recalculation until W becomes 25 pixels or more while changing H to be smaller little by little (it should be noted that x' also depends on H).

Next, a positional relationship between one block and another block adjacent thereto is considered.

As illustrated in FIG. 9, it is considered that an (n+1)-th block $B_{n+1}$ is disposed by shifting by skip_h in the horizontal axis direction, and for skip_v in the vertical axis direction from an n-th block $B_n$. When $0°<\theta_1\leq 45°$, the blocks are to be disposed while gradually shifting in an upper right direction.

Here, the tilt angle of the upper side and the lower side in the drawing of the barcode symbol is $\theta_1$, and therefore, when the n-th block $B_n$ falls within the barcode area, the block does not protrude to outside the barcode area by going through the upper or lower sides at a destination as long as the block is moved in the upper direction by skip_h×tan $\theta_1$ simultaneously with the movement in the right direction by skip_h (although there is a case where the block protrudes to outside the barcode area by going through the right side in the drawing, this causes no problem).

Accordingly, if it is considered to dispose the block within the barcode area, it is desirable to satisfy the following expression, and such configuration is adopted here.

$$\text{skip\_}v=\text{skip\_}h\times\tan\theta_1 \quad \text{(expression A)}$$

On the other hand, as can be seen from FIG. 8 or the like, when the block is moved to the right, the bars positioning at a more right side among the barcode symbol 41 are included in the block. On the other hand, when the block is moved upward, the bars positioning at the more right side among the barcode symbol 41 are included in the block. Note that when the block is moved upward, a moved amount becomes $\tan\theta_1$ times as that when the block is moved to the right.

As illustrated in FIG. 10, a displacement amount in the horizontal direction between the image data of the n-th block and the image data of the (n+1)-th block is skip_h as stated above.

It is necessary that skip_h<W is satisfied so that the luminous distributions of the adjacent blocks in the barcode symbol 41 partially overlap with each other. Note that when skip_h is too small, a lot of blocks are required to cover the whole area in the arrangement direction of the barcode, and calculation efficiency is lowered. {0060} At the end part of the block, reliability of the luminous distribution obtained at step S9 in FIG. 2 is low, and therefore, to secure a wide overlapping area to some extent, it is preferable that a value of skip_h is changed in accordance with $\theta_1$ to satisfy, for example, below.

$$\text{skip\_}h=W/2(0°\leq\theta_1<25°), W/4(25°<\theta_1\leq45°)$$

The same idea works out when $\theta_1$ is at a range other than $0°\leq\theta_1\leq45°$.

For example, when $-45°\leq\theta_1<0°$, a shape of the block is as illustrated in FIG. 11, but when it is considered as illustrated in FIG. 12, W can be obtained as follows similarly to the case of FIG. 8.

$$W=\frac{3}{4}\times W_{max}=\frac{3}{4}\times(x'-x_4+H\tan\theta_1)$$

Note that in the range of $-45°\leq\theta_1<0°$, since $H\tan\theta_1$ is a negative value, the sign of the term $H\tan\theta_1$ is inverted.

When $45°<|\theta_1|<90°$, an arithmetic operation similar to FIG. 8 or FIG. 12 may be performed while substituting y for x.

After disposing the blocks as stated above, it is possible to similarly perform the process of step S6 and later in FIG. 2 regardless of positive and negative of $\theta_1$. Note that when $45°<|\theta_1|<90°$, though a line used for extracting the luminous distribution at step S6 becomes in the vertical direction (refer to FIG. 4), it is still a line in parallel with the side in the pixel arrangement direction of the image.

By the image processing method of the embodiment as stated above, it is possible to enhance the resolution and to read with high accuracy regardless of how the barcode in the captured image is tilted, namely, regardless of the arrangement direction of the optical information of the reading target object in the captured image. Improvement in the reading accuracy in the embodiment is attained by the following two mechanisms.

The mechanisms are described with reference to FIG. 13A and FIG. 13B.

The first point is that the barcode information is constantly read along a pixel arrangement as illustrated by D1 in FIG. 13A even if the barcode is tilted, and thereby, a width of each bar becomes substantially $1/\cos\theta$ times compared to a case where the barcode is read along an arrangement direction D2 of the bars. Accordingly, the number of pixels used for the reading also becomes $1/\cos\theta$ times and high resolution is enabled. Note that $\theta$ is a tilt angle of the barcode symbol.

On the other hand, conventionally, it is general that the reading is performed in a direction vertical to the bars as illustrated by D3 in FIG. 13B. Also in this case, the pixels are horizontally disposed as illustrated by D4, and therefore, the number of pixels corresponding to the same barcode width becomes $\cos\theta$ times compared to the case where there is no tilt to be low resolution.

Namely, the method according to the embodiment in which the barcode information is read along the pixel arrangement (the "line" at step S6 in FIG. 2) regardless of the tilt of the barcode is remarkably advantageous to enable high resolution. Specifically, the barcode information is constantly read along the pixel arrangement, and thereby, the resolution is $1/\cos^2\theta$ times enhanced in total relative to the case where the reading is performed in the direction vertical to the barcode.

The second point is that the one-dimensional images of a plurality of lines obtained by taking out along the pixel arrangement from the barcode image with tilt have a lateral displacement of non-integral multiple of the pixel pitch with each other (refer to FIG. 19), and therefore, the information in the magnitude of the pixel pitch or less is compensated through the combination thereof and the high-resolution is enabled. When a barcode symbol where bars are arranged in the same direction as a pixel arrangement in a tetragonal lattice of the image sensor is captured, all of the one-dimensional images of the lines will be the same, and the information in the magnitude of the pixel interval or less cannot be obtained, but when a tilted barcode symbol is captured, each bar is inclined relative to the pixel arrangement, and therefore, the information in the magnitude of the pixel interval or less can be obtained by compensating the one-dimensional images of the respective lines with each other.

In the embodiment, the first point is automatically realized by a physical disposition, the second point is realized through the image processing, and both are realized independently and simultaneously.

Accordingly, it is possible to read the barcode symbol with an accuracy as if the image-capturing were performed with resolution higher than the resolution held by an imaging device.

At this time, a method is taken in which the barcode image is divided into blocks, the blocks are individually processed to enhance resolution, and thereafter the blocks are coupled. Therefore, the problem such that the read line passing through the whole width of the barcode area cannot be drawn when the tilt of the barcode area is large, as described using FIG. 20, does not occur.

Further, the shape of the block for the cut-out is the parallelogram, and the upper and lower sides are set in the horizontal direction of the pixel arrangement, and the other pair of sides are aligned with the tilt of the barcode, and therefore, the respective lines in one block including the both end parts thereof have almost the same luminous distribution, and therefore, the accuracy of the resolution enhancing process is improved.

Besides, as for geometrical distortion of the barcode generated by a capturing environment, it can be regarded to be uniform in divided blocks, and therefore, it is possible to perform the resolution enhancing process by each block without worrying about overall distortion.

Here, results of readings of barcode symbols using an apparatus of the embodiment executing the process in FIG. 2 and an apparatus of a comparative example not executing the process in FIG. 2 are illustrated.

At first, illustrated are a result of reading of a barcode symbol with a 3.0 mil size and in Code 39 standard at a distance of 130 mm. Note that an optical system whose focal length of the lens 12 is at approximately 130 mm and there is no trouble in image-forming is used.

At first, results of the reading using a first comparative example are illustrated in FIG. 14.

The first comparative example is an example in which a reading line is taken in a direction vertically crossing the barcode in the captured image as illustrated by D2 in FIG. 13A and D3 in FIG. 13B, and decoding is performed by acquiring a luminous distribution on the reading line.

Besides, the results in trials for five times are illustrated in FIG. 14. A leftmost column is the result at the first trial, and a rightmost column is the result at the fifth trial. A symbol "×" indicates that the reading was impossible at the corresponding trial.

As it can be seen from FIG. 14, the readings were impossible under all conditions in the first comparative example. This result indicates that an image having resolution enough for the reading using the method of the first comparative example cannot be captured by the optical part 10 used for the experiment.

Next, results of the reading using a second comparative example are illustrated in FIG. 15.

The second comparative example is an example in which the luminous distributions on the plurality of reading lines as illustrated by L1 and L2 in FIG. 19 passing through the whole width of the barcode area in the captured image are respectively acquired, and decoding is performed on the luminous distribution obtained by applying the super-resolution method on the acquired luminous distributions.

Indication format of the results in FIG. 15 is the same as the case of FIG. 14, where a symbol "○" indicates that the reading succeeded, and a symbol "Δ" indicates that the decoding process itself succeeded but the result thereof was incorrect. Besides, a symbol "N/A" indicates that there was no data.

It can be seen from the results in FIG. 15 that there was a certain range in which the reading can be successfully performed by applying the super-resolution method. However, as it is described using FIG. 20, when an absolute value of $\theta_1$ is large, it is impossible to draw a line passing through the whole width of the barcode area, and the super-resolution method cannot be applied. Accordingly, the experiments were not performed under a condition that the absolute value of $\theta_1$ is 25° or more because it is obvious that the super-resolution cannot be applied.

Note that when $\theta_1=0°$, displacement does not occur in the positions of the bars between the lines, and therefore, the experiment under this condition was not also performed because the super-resolution method cannot be applied.

Next, results of the reading using the above-stated embodiment are illustrated in FIG. 16.

Indication format of the results in FIG. 16 is the same as the cases of FIG. 14 and FIG. 15. As it can be seen from FIG. 16, decoding succeeded in almost all trials regardless of values of $\theta_1$ by applying the process in FIG. 2.

The results in FIG. 16 were obtained by using the same hardware as that used in the first and second comparative examples while only changing the image processing method. Accordingly, it can be said that the accuracy of the barcode symbol reading is drastically improved by the process in FIG. 2. In particular, it can be said that fine information can be read with high accuracy regardless of the arrangement direction of the optical information in the image. This is because it is possible to read the barcode symbol with the accuracy as if the image-capturing were performed with resolution higher than the resolution held by an imaging device.

Note that the data as for the condition of $\theta_1=0°$, ±90° do not exist because the displacement does not occur in the positions of the bars between the lines, and the super-resolution method cannot be applied in these conditions. Besides, the data as for the condition of $\theta_1=\pm45°$ do not exist because the displacement by only 0 (zero) pixel or 0.5 pixels occurs under this condition.

However, when an actual reading environment is considered, it is conceivable that there is not a possibility that $\theta_1$ exactly coincides with specific angles such as 0°, ±45°, ±90° unless the reading target object and the barcode reader are fixed under a specific condition. Besides, it is conceivable that normally, there is no necessity to exactly fix the reading target object and the barcode reader at this angle even when they are fixed. Accordingly, it is conceivable that there is no special problem in the actual reading environment if there are some angles at which the reading cannot be performed.

Besides, there are illustrated the number of times of success when the readings are tried five times at various read distances for the barcode symbols with various sizes and in Code 39 standard by using the apparatuses of the above-stated embodiment and the first comparative example in FIG. 17 and FIG. 18. $\theta_1$ is set at 20°. Numerals in parentheses represent the numbers of times of misreading while the decoding process itself succeeded. FIG. 17 illustrates results of the reading when utilizing the embodiment, and FIG. 18 illustrates results of the reading when utilizing the first comparative example.

It can be seen that the finer barcode symbol can be read in a wider distance range by using the same hardware through the process in FIG. 2 from a comparison of these results.

Hereinabove, the description of the embodiment is completed, but it goes without saying that the configuration of the apparatus, the kinds of the reading target code symbol, procedures of the concrete processes, and so on are not limited to ones described in the above-stated embodiment.

As for the disposition of the blocks, the example in which the first block is disposed at the end of the barcode area is described, but the first block may be protruded from the end of the barcode area in the arrangement direction of the bars.

Besides, it is also conceivable that each block protrudes from the barcode area in the longitudinal direction of the bars. Also in this case, it is possible to perform the subsequent processes without any problem as long as the line used at step S6 in FIG. 2 does not protrude from the barcode area in the longitudinal direction of the bars.

Further, it is not essential to apply the super-resolution method using the luminous distribution data for the plurality of lines as for each block. Besides, it is not also essential to individually calculate $\theta_2$ as for each block. It is also conceivable that the value of $\theta_1$ is used as $\theta_2$ as it is.

Besides, it is not necessary that the positional relationships between the adjacent blocks are common as for all the blocks. Namely, it is conceivable that the values of skip_h and skip_v are different by each block. Further, it is conceivable that the sizes of the blocks are different by blocks.

Besides, the optical information reader where the present invention is applied may be constituted as a stationary-type apparatus or as a handheld-type apparatus.

Further, in the above-stated embodiment, the example in which the barcode reader 100 performs up to the decoding process is described, but the luminous distribution data may be outputted or stored in a state where the process up to step S11 in FIG. 2 is performed. Besides, it is conceivable to constitute the decoder 20 as an apparatus independent from the optical part 10. In this case, it is possible to constitute the decoder 20 as an image processing apparatus which performs the image processing on an input image data.

Besides, the optical information of the reading target is not necessarily limited to the code symbol in which the white bars and the black bars are alternately arranged. It may be ones containing bars of halftone or other colors. Otherwise, it may be one whose color or concentration continuously changes. Incidentally, information to be decoded is one arranged in only one direction. The color and the concentration are uniform in a direction perpendicular to the arrangement direction.

Further, the configurations and the modification examples described hereinabove can be applied individually or appropriately combined with each other within a consistent range.

INDUSTRIAL APPLICABILITY

According to the image processing method of the optical information reader and the optical information reader described hereinabove, it is possible to read the optical information on the reading target object with high accuracy. Accordingly, it is possible to improve convenience of the optical information reader.

REFERENCE SIGNS LIST

10 . . . optical part, 11 . . . imaging sensor, 12 . . . lens, 20 . . . decoder, 21 . . . CPU, 22 . . . ROM, 23 . . . RAM, 24 . . . communication I/F, 31 . . . operation part, 32 . . . notification part, 40 . . . reading target object, 41 . . . barcode symbol, B . . . block, C . . . barcode area, D . . . lateral displacement, L1, L2 . . . line, P . . . pixel pitch

The invention claimed is:

1. An image processing method for an optical information reader which reads optical information arranged on a target object by analyzing an image of the target object captured through an imaging device, comprising:
    calculating an arrangement direction of the optical information in the image captured by the imaging device;
    disposing, in an area of the image in which the optical information is arranged, a plurality of blocks such that the plurality of blocks cover a whole range in the arrangement direction of the optical information, each of the blocks being in a parallelogram shape in which facing two sides are in parallel with a pixel arrangement direction of the image and the other two sides are vertical to the arrangement direction of the optical information;
    generating, for each of the blocks, a first arrangement data indicating arrangement of the optical information in the block based on the image data of the block; and
    generating a second arrangement data indicating arrangement of the whole optical information by combining the respective first arrangement data for the plurality of the blocks,
    wherein the parallelogram shape excludes a square shape or a rectangular shape.

2. An image processing method according to claim 1,
    wherein the generating of the first arrangement data comprises for each of the blocks:
calculating a second arrangement direction of the optical information in the block; and
generating the first arrangement data based on the second arrangement direction.

3. An image processing method according to claim 1,
    wherein the generating of the first arrangement data comprises for each of the blocks:
aligning positions of plural lines of the image data in the block with higher resolution than that of the image data based on the positions of the lines and the arrangement direction of the optical information in the block, the lines being in parallel with the facing two sides of the block; and
generating the first arrangement data with the higher resolution based on the plural lines of the image data after the aligning.

4. An image processing method according to claim 1,
    wherein the disposing is disposing the plurality of blocks such that adjacent blocks partially overlap with each other, and
    wherein, in the generating of the second arrangement data, the first arrangement data of the adjacent blocks are combined such that the first arraignment data of the adjacent blocks match with each other in an overlapping portion of the adjacent blocks.

5. An image processing method according to claim 1,
    wherein a size of the block is determined based on coordinates of four corners of the area in which the optical information is arranged in the image of the target object and the calculated arrangement direction of the optical information.

6. An image processing method according to claim 1, further comprising: decoding the generated second arrangement data.

7. An optical information reader configured to read optical information arranged on a target object by analyzing an image of the target object captured through an imaging device, comprising:
    a calculator configured to calculate an arrangement direction of the optical information in the image captured by the imaging device;
    a block disposer configured to dispose, in an area of the image in which the optical information is arranged, a plurality of blocks such that the plurality of blocks cover a whole range in the arrangement direction of the optical information, each of the blocks being in a parallelogram shape in which facing two sides are in parallel with a pixel arrangement direction of the image and the other two sides are vertical to the arrangement direction of the optical information;
    a first generator configured to generate, for each of the blocks, a first arrangement data indicating arrangement of the optical information in the block based on the image data of the block; and
    a second generator configured to generate a second arrangement data indicating arrangement of the whole optical information by combining the respective first arrangement data for the plurality of the blocks,
    wherein the parallelogram shape excludes a square shape or a rectangular shape.

* * * * *